(No Model.)
G. W. & C. M. KILER.
FENCE POST.
No. 342,443. Patented May 25, 1886.
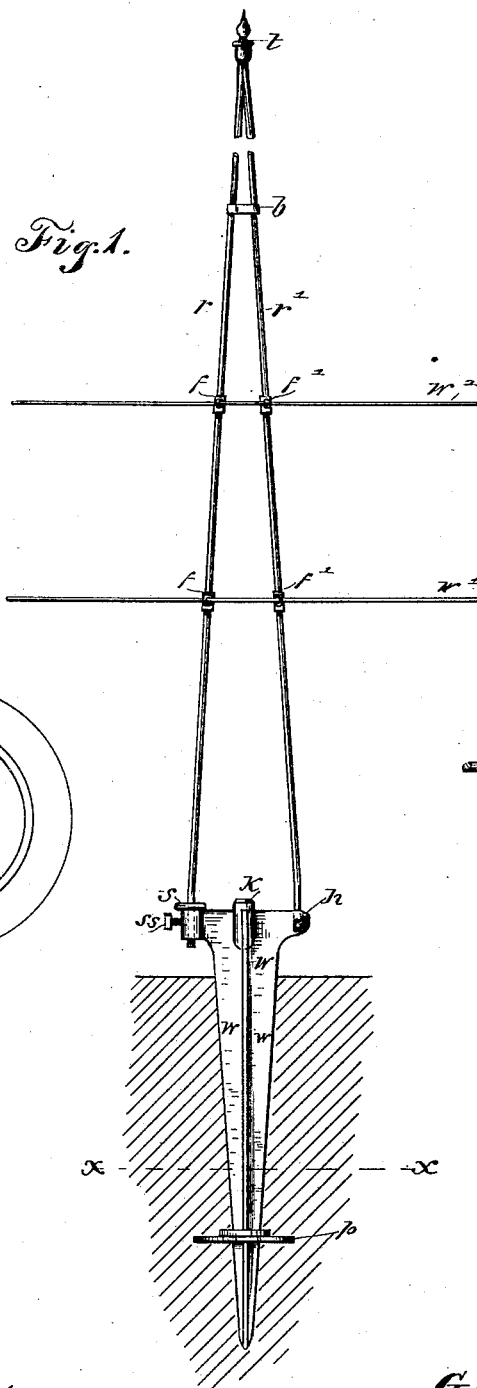
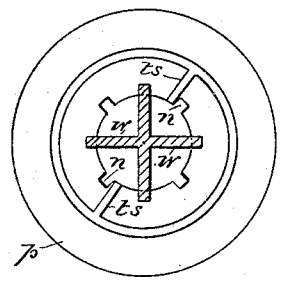
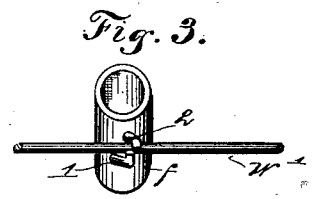
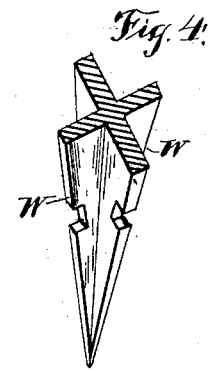
WITNESSES.
Jacob W. Loeper
H. G. Sturm.
INVENTOR.
Geo. W. Kiler
Chas. M. Kiler
By C. P. Jacobs
Atty.

UNITED STATES PATENT OFFICE.

GEORGE W. KILER AND CHARLES M. KILER, OF INDIANAPOLIS, INDIANA.

FENCE-POST.

SPECIFICATION forming part of Letters Patent No. 342,443, dated May 25, 1886.

Application filed May 29, 1885. Serial No. 167,118. (No model.)

*To all whom it may concern:*

Be it known that we, GEORGE W. KILER and CHARLES M. KILER, residents of Indianapolis, Indiana, have made certain new and useful Improvements in Adjustable Iron Fence-Posts, a description of which is set forth the following specification, reference being in made to the accompanying drawings, in the several figures of which like letters indicate like parts.

Our invention relates to the arrangement and connection of an adjustable iron fence-post to the base; and it consists in the arrangement of parts hereinafter more particularly set forth and claimed, being an improvement upon the device shown in our former Letters Patent No. 319,823, issued to us June 9, 1885, and will be understood from the following description.

In the drawings, Figure 1 represents a side view of our device, the post being connected with the base, and two fence-wires attached to the post. Fig. 2 is a sectional view of the base on the line $x$ $x$, Fig. 1, looking downward, showing also a top view of the plate $p$. Fig. 3 is a detailed view of the wire-lock. Fig. 4 is a perspective view of the lower part of the base, the drawings in Figs. 2, 3, and 4 being on a larger scale than in Fig. 1.

In detail, the base, which is shown set into the ground in Fig. 1, is preferably made of cast-iron, having wings $w$ and a boss or knob, $k$, on the top for driving the post into the ground. On one side of these wings is shown a hole to receive the hook $h$ of the rod $r'$. On the opposite side is shown a socket, $s$, which receives the other rod, $r$; and $ss$ is a set-screw for holding the rod in place in the socket and preventing its slipping.

The post itself is composed of two rods, $r r'$, which may be welded at the top, if desired; but the way we make it is to shape the ends of these rods so that they will lie with their flat beveled sides together at the top, and a top piece, $t$, made of metal, heated, is then driven over the ends of the rods while hot, and when the metal shrinks, as it will in cooling, the ends will be firmly united together by the top piece or ornament, $t$. This avoids the expense of welding or otherwise connecting the ends together. $b$ is a brace for bracing the two rods that compose the post in position, as shown.

$f$ and $f'$ are wire-locks, which are shown in detail in Fig. 3. They are composed of ferrules, which are slipped down on the rods that compose the post—as many as may be desired—the hole through them being formed slightly tapering, so as to fit at any desired place on the rod, and on the outside of these ferrules are projections 1 and 2, between which the wire $w'$ of the fence is passed, and the two projections 1 and 2 are then pinched or hammered together, holding the wire in position. These wire-locks are made of malleable iron, so that there will be no difficulty in bending the hooks in any desired direction.

$p$ is a lock-plate having a central opening, in the sides of which are cut notches $n$, and on the opposite sides of this opening are formed stops $ts$, as shown in Fig. 2. This plate is intended to be used near the bottom ends of what are called the "corner" or "end" bases for the purpose of anchoring them more securely in the ground. The plate is slipped over the pointed end of the base in the position shown in Fig. 1, and notches are cut in the wings of the base at the points indicated by the dotted lines in Fig. 2, wide enough to allow the plate $p$ to turn in said notches, and when the plate $p$ has been pushed up as far as these notches this plate is turned in the notches of the wings until the ends of the wings strike the stops $ts$, thus locking the plate in position on the base. The dotted lines near the ends of the wings in Fig. 2 show the position of these notches cut in such wings. It is obvious that if these notches were not thus cut in the sides of these wings the plate could not be turned upon the base, and it only can be turned at a point where these notches are formed. Of course when these plates are used holes must be dug in the ground to receive the base, as it could not be driven in with these plates attached; but wherever these plates are not used the bases may be driven into the ground without first digging the hole. In some cases the hook $h$ may be dispensed with and the rod left straight, and a socket similar to $s$ used on both sides of the base.

What we claim as our invention, and desire to secure by Letters Patent, is the following:

1. The cast-metal base having wings $w$, each having a notch near its lower end, the open socket $s$ on one side of such base to receive one of the rods of which the post is composed and a hole upon the other side of the base to receive the hook or projection of the other rod composing the post, in combination with the lock-plate having notches $n$, substantially as described.

2. The fence-post composed of the rods $r\ r'$ converging to and united at the top, as shown, in combination with the metal base having wings $w$, each having a notch near its lower end, the open socket $s$ on one side of the base, and a hole upon the other to receive the hook $h$, formed upon one of the rods composing the post, and the lock-plate 1, having notches $n$, all combined substantially as described.

In witness whereof we have hereunto set our hands this 19th day of May, 1885.

GEO. W. KILER.
CHAS. M. KILER.

Witnesses:
C. P. JACOBS,
W. E. BARTON.